United States Patent [19]

Nagy

[11] 3,839,760

[45] Oct. 8, 1974

[54] AIRCRAFT LOADING BRIDGE

[75] Inventor: Neil F. Nagy, Torrance, Calif.

[73] Assignee: Foremark Corporation, Gardena, Calif.

[22] Filed: June 14, 1972

[21] Appl. No.: 262,555

[52] U.S. Cl. ................................................. 14/71
[51] Int. Cl. ............................................ B65g 11/00
[58] Field of Search .................................... 14/71, 72

[56] References Cited
UNITED STATES PATENTS

| 2,875,457 | 3/1959 | Read | 14/71 |
| 3,341,875 | 9/1967 | Wollard | 14/71 |
| 3,524,207 | 8/1970 | Giarretto | 14/71 |
| 3,538,529 | 11/1970 | Breier | 14/71 |
| 3,728,754 | 4/1973 | Lodjic | 14/71 |

FOREIGN PATENTS OR APPLICATIONS

| 1,814,165 | 12/1968 | Germany | 14/71 |

Primary Examiner—Nile C. Byers, Jr.
Attorney, Agent, or Firm—Edward D. O'Brian

[57] ABSTRACT

An aircraft loading bridge capable of serving aircraft having only one access door and aircraft having two access doors located different distances from one another can be constructed utilizing a sectionalized loading bridge tunnel. This tunnel carries two separate vestibules, both of which can be moved so as to extend outwardly from the side of the tunnel various distances. One of the vestibules is also mounted so as to be movable part way along the length of the tunnel so as to be positioned from the other of the vestibules a distance which is dependent upon the distance between two different access doors in an aircraft hull. Support means are provided so that the sections of the aircraft tunnel may be located relative to one another in any manner necessary to gain access to an aircraft through one or both of the vestibules.

7 Claims, 8 Drawing Figures

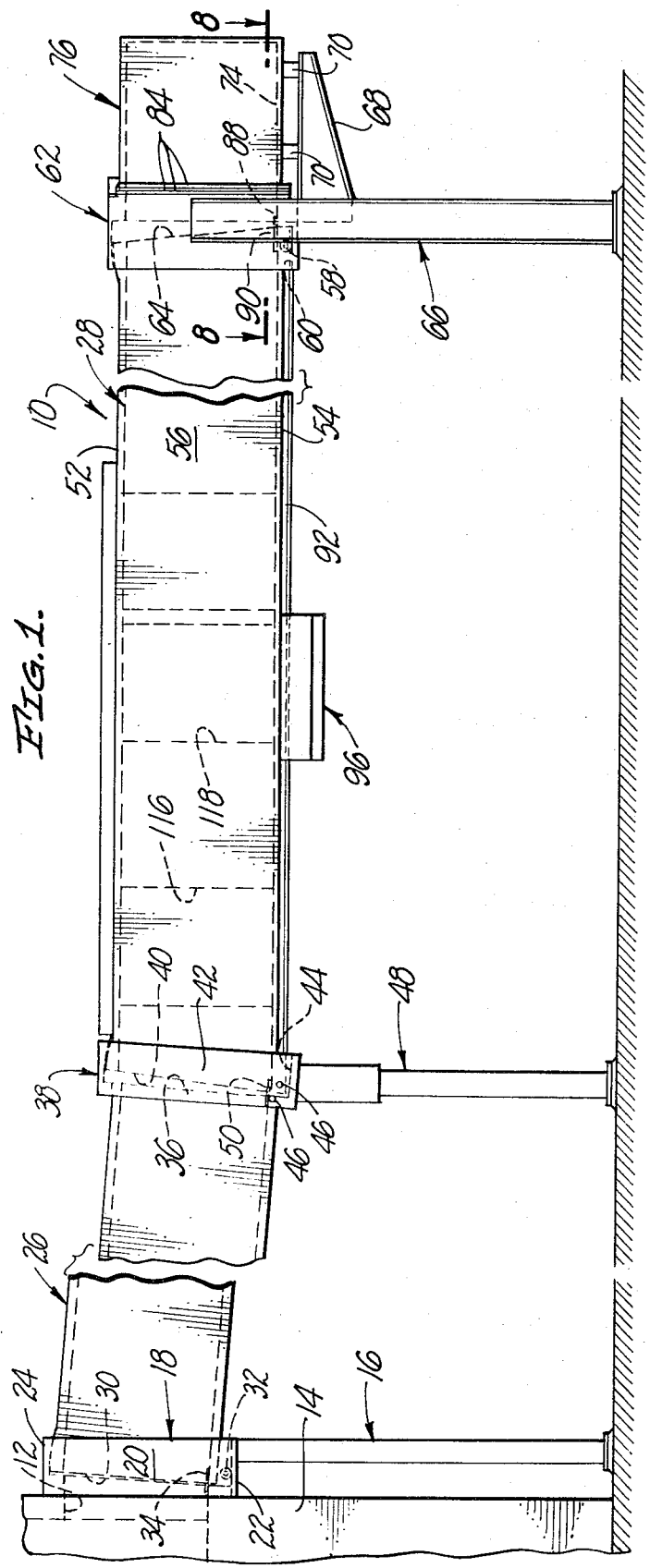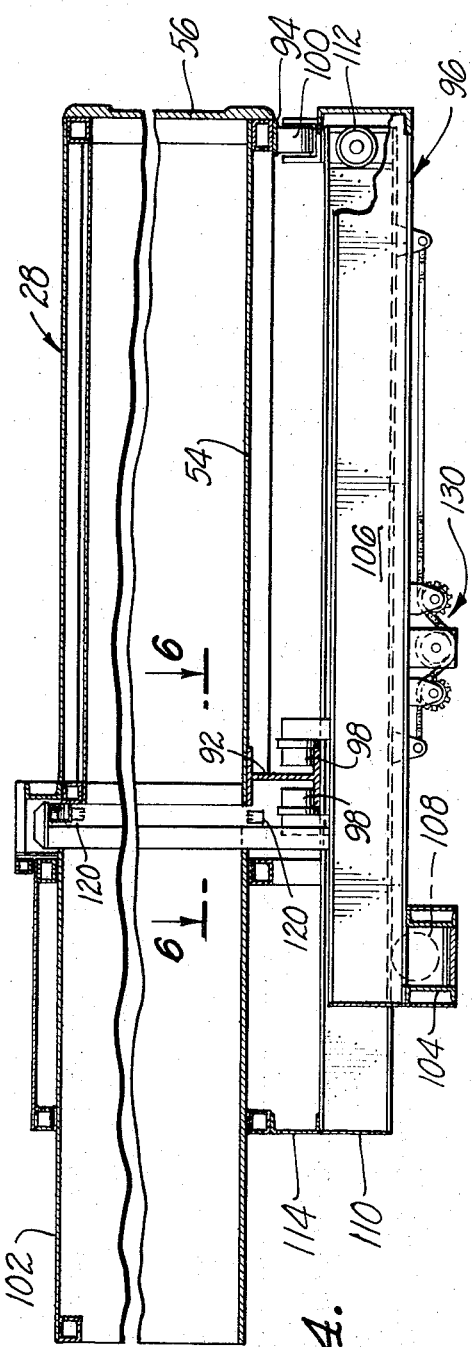

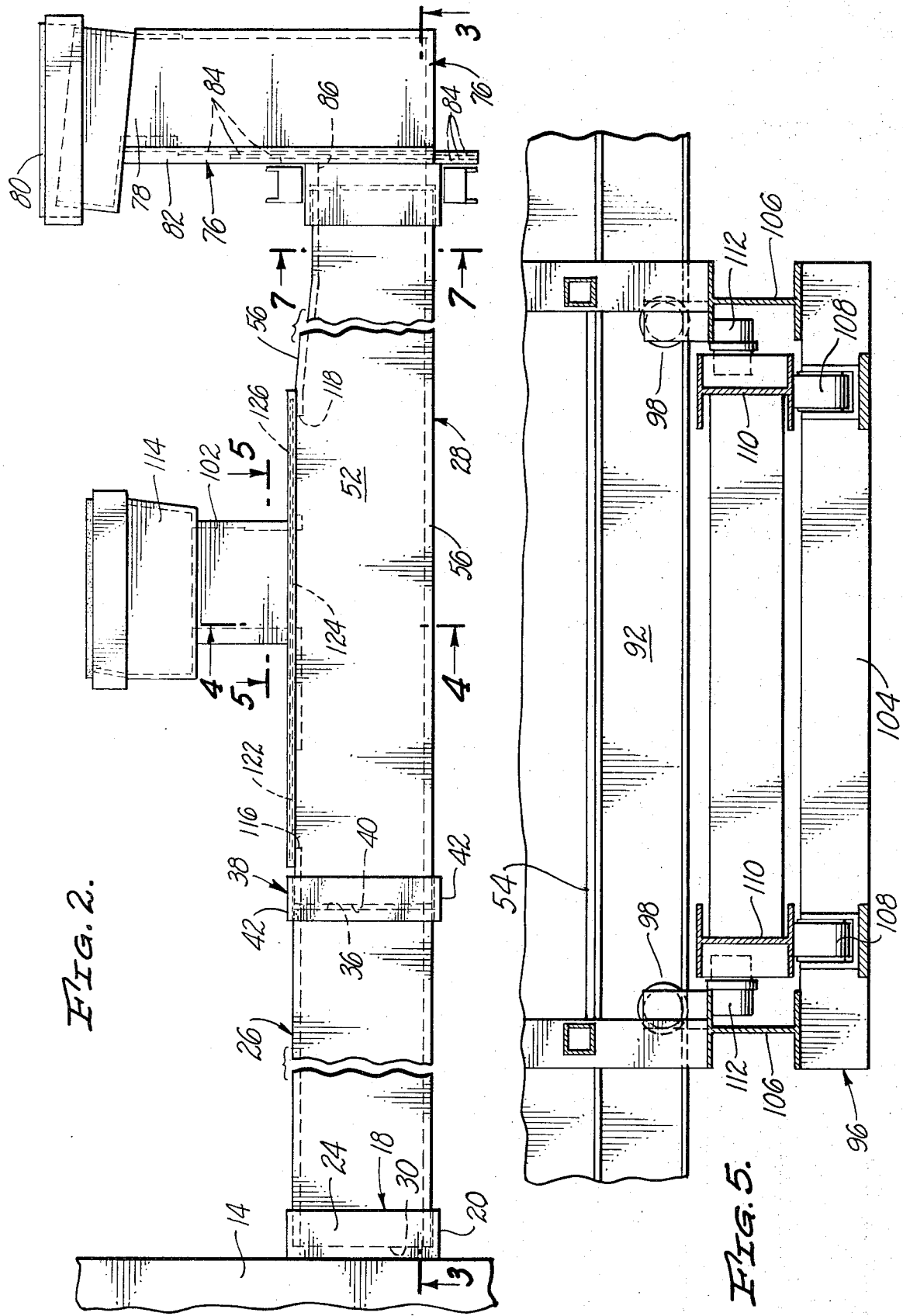

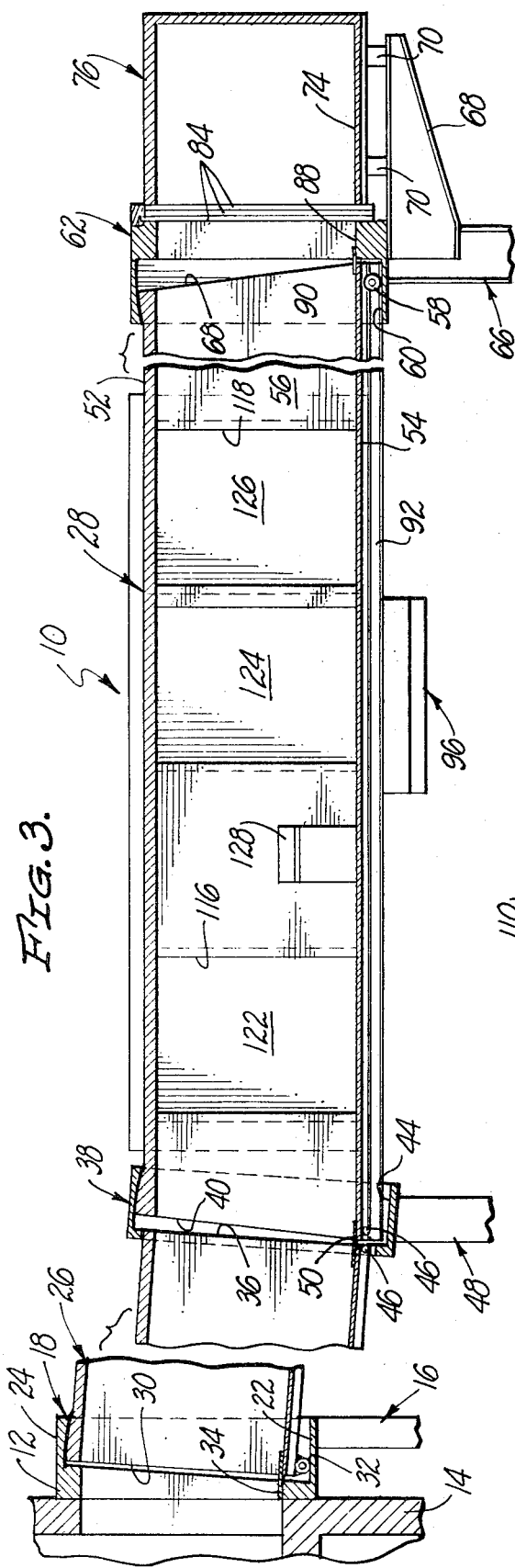

AIRCRAFT LOADING BRIDGE

CROSS-REFERENCE TO RELATED APPLICATIONS

This application contains subject matter which is related to that set forth in the co-pending U.S. patent application in the name of Gacs, et al., filed Mar. 1, 1972, Ser. No. 230,829 entitled, "Aircraft Loading Bridge."

BACKGROUND OF THE INVENTION

Aircraft loading bridges are commonly utilized at aircraft terminals to provide access between such terminals and the interiors of aircraft temporarily located at such terminal. In the past, such bridges have been constructed in a number of different manners which are dependent upon the ways in which aircraft are to be parked, the nature of the aircraft to be serviced, the particular manufacturing and engineering capability of a bridge manufacturer and the like. Developments in the aircraft field and more specifically the development of increasingly large aircraft have, in effect, obsoleted many if not all conventionally utilized aircraft loading bridges.

At the present time, so-called "jumbo" aircraft are in their initial stages of use by airlines. Such large aircraft normally have at least two passenger loading doors or openings located along the lengths of their hulls. Various different aircraft manufacturers have spaced such openings various different distances from one another. Although aircraft loading bridges capable of servicing several doors or openings in an aircraft hull are now known and to some extent utilized, these bridges do not have the flexibility of operation to accommodate their use with access doors or openings located at different distances from one another.

This is a matter of critical importance to various airlines. It is obviously impractical to utilize at an aircraft terminal a different bridge for each type of airplane that an airline may operate. To be satisfactory an aircraft loading bridge must be capable of adequately servicing aircraft having only one loading or access door as well as aircraft having several access doors. Further, a loading bridge must be adequately flexible in its operation so as to be capable of being used with a variety of different aircraft having such doors at different heights and with aircraft having several access doors spaced varying distances from one another.

BRIEF SUMMARY OF THE INVENTION

A primary objective of the present invention is to provide new and improved aircraft loading bridges. More specifically, an objective of this invention is to provide loading bridges which are capable of being utilized with a wide variety of different aircraft having one or more access doors. Another objective is to provide loading bridges of the type indicated which may be easily and conveniently manufactured at a comparatively nominal cost, which may be easily installed at an aircraft terminal and which are capable of giving prolonged, reliable performance. A further objective of the invention is to provide bridges as described which may be easily and conveniently used by both airlines and by passengers.

In accordance with this invention these and various related objectives of the invention as will be apparent from a detailed consideration of the remainder of this specification are achieved in an aircraft loading bridge for use in providing access between an aircraft terminal opening and an aircraft, the bridge having a tunnel extending from the terminal in communication with the opening the improvement comprising: a tunnel section carrying two separate vestibules, both of which are capable of being moved so as to extend outwardly from a side of the tunnel varying distances, one of said vestibules being mounted so as to be movable part way along the length of the tunnel section so as to be positioned from the other of said vestibules a distance which is dependent upon the distance between two different access doors in an aircraft hull and support means for the tunnel section so that it may be located in any manner necessary to gain access to an aircraft through either one or both of the vestibules.

An aircraft tunnel in accordance with this invention includes many different structures and features than can be effectively indicated in a summary of this type. Preferably the loading bridge includes two different tunnel sections and two different tunnel supports upon which the sections are mounted in such a manner that they may be located in various relative positions with respect to one another by actuation of the supports so that the tunnel sections may be raised and lowered to accommodate aircraft having loading doors at various heights.

BRIEF DESCRIPTION OF THE DRAWINGS

Further details of the present invention are best indicated with reference to the remainder of this specification, the appended claims and the accompanying drawings in which:

FIG. 1 is a side elevational view of a presently preferred embodiment of an aircarft loading bridge in accordance with this invention in which central portions of the tunnel sections illustrated have been broken away to a degree for convenience of illustration and explanation;

FIG. 2 is a top plan view of this loading bridge;

FIG. 3 is a cross-sectional view taken at line 3—3 of FIG. 2;

FIG. 4 is a cross-sectional view taken at line 4—4 of FIG. 2;

FIG. 5 is a cross-sectional view taken at line 5—5 of FIG. 2;

FIG. 6 is a partial cross-sectional view taken at line 6—6 of FIG. 4;

Figure 7:
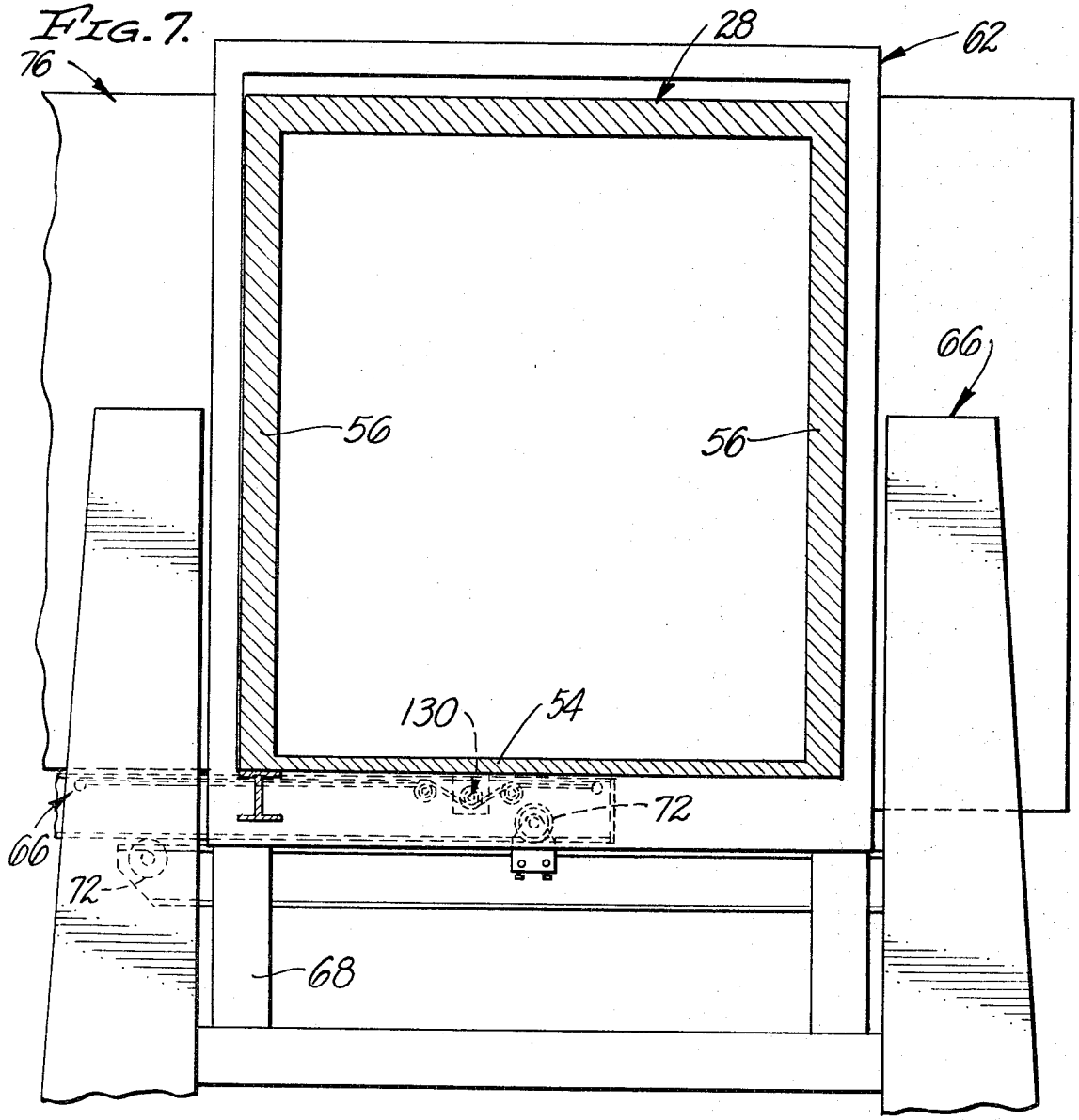
FIG. 7 is a cross-sectional view taken at line 7—7 of FIG. 2.
Figure 8:
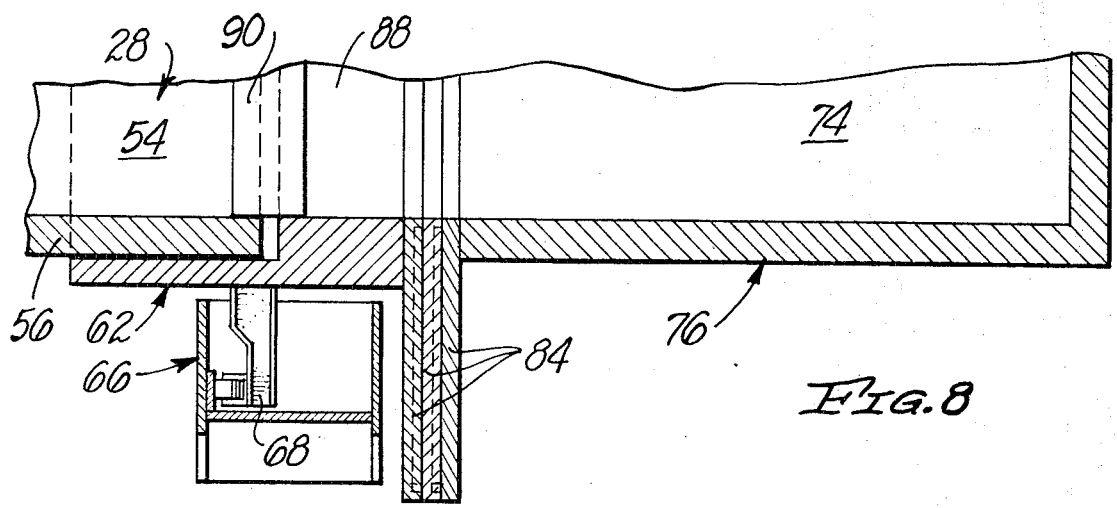
FIG. 8 is a partial cross-sectional view taken at line 8—8 of FIG. 1.

The accompanying drawings are primarily intended for explanatory purposes in illustrating the essential features or concepts of the present invention as are set forth and summarized in the appended claims. It will be realized that these concepts may be utilized with other somewhat differently appearing and somewhat differently constructed aircraft loading bridges through the use of routine engineering skill in the loading bridge field without departing from the scope of the invention.

DETAILED DESCRIPTION OF THE PREFERRED EMBODIMENT

In the drawings there is shown an aircraft loading bridge 10 in accordance with this invention which is utilized in providing access to aircraft (not shown) from an opening 12 in an aircraft terminal 14. This terminal 14 is preferably provided with an "auxiliary" support 16 having a rectangular frame 18 extending around the opening 12. This frame 18 includes conventional sides 20, a bottom 22 located beneath the bottom of opening 12 and a top 24 located above the top of the opening 12.

In accordance with this invention the bridge 10 includes first and second tunnel rectilinear sections 26 and 28, respectively, which together constitute a complete bridge tunnel. Both of these tunnel sections 26 and 28 correspond in internal dimension to the dimensions of the opening 12. The first tunnel section 26 has an end 30 which is located generally within the frame 18 and which is supported on the bottom 22 by means of rollers 32 carried by the end 30. In order to provide weather protection, the tunnel section 26 preferably fits closely adjacent to the sides 20 and the top 24 of the frame 18 in such a manner that this tunnel section 26 is capable of a limited degree of rotation relative to the terminal 14. If desired, a small, conventional flexible walkway 34 may extend from the bottom of the opening 22 into the tunnel section 26 so as to prevent any danger of a passenger tripping because of the space between the end 30 and the terminal 14.

The tunnel section 26 also includes an end 36 which is located generally within another rectilinear frame 38 so that the end 36 is adjacent to, but spaced from an end 40 of the tunnel section 28. The end 40 also projects into the interior of this frame 38. Both the ends 36 and 40 are pivoted to the sides 42 of the frame 38 a comparatively short distance above the bottom 44 of this frame 38 by pivots 46. This structure permits the two tunnel sections 26 and 28 to be moved so that they may be located in various relative positions with respect to one another while still being in communication with one another.

With the bridge 10, the ends 36 and 40 are moved vertically through the use of a vertically movable first support structure 48. This support structure 48 is preferably a conventional design. For this reason it is not described in more detail in this specification. A number of different known support structures may be used as the support structure 48. Thus, this support structure 48 may be a conventional hydraulic lift, two telescopic members adapted to be raised and lowered by means of an internal ball screw or the like. This support 48 is, of course, attached to the frame 38 so as to move this frame 38 up and down as the bridge 10 is adjusted in position to accommodate a specific aircraft.

Preferably, the frame 38 fits closely with respect to the tunnel sections 26 and 28 in order to permit these sections 26 and 28 to be located at a comparatively small angle to one another or in alignment with one another as the bridge 10 is used, and in order to provide internal protection in the bridge from ambient weather conditions. If desired, a flexible walkway 50, similar to the walkway 34 may be located to extend across the space between the ends 36 and 40 in order to prevent a passenger from tripping because of the presence of this space.

The second tunnel section 28 includes a top 52, a bottom 54 and connecting sides 56. It is normally supported relative to the support 48 by means of rollers 58 carried by the bottom 54 resting upon the bottom 60 of another rectilinear frame 62. This frame 62 corresponds in a generalized manner to the frames 18 and 38 and fits around an end 64 of the tunnel section 28 remote from the terminal 14 in order to provide protection against ambient conditions for the interior of the bridge 10.

This frame 62 is carried by a second support 66 in such a manner that it may be raised and lowered vertically so as to adjust the relative position between the tunnel sections 26 and 28 in any position of the first support 48. This second support 66 may be of any convenient known design of the type indicated in the discussion of the support 48. In the embodiment of the invention illustrated this support 66 is constructed in the same manner as related supports as are illustrated in the aforenoted co-pending U.S. Pat. application, Ser. No. 230,829. For the purpose of amplifying this disclosure as to the construction of this support 66 and other subsequently described parts of the bridge 10, the entire disclosure of this co-pending application is incorporated herein by reference.

The frame 62 carries an extended framework 68 which extends from it on the side of the support 66 remote from the tunnel section 28. This framework 68 is used in connection with parallel rails 70 engaged with wheels 72 to support the bottom 74 of a vestibule 76 in the manner described in the aforenoted co-pending U.S. patent application. It is noted that the wheels 72 are mounted on the framework 68 so that the rails 70 are engaged in such a manner that the vestibule 76 is stablized for horizontal movement. This structure is designed so that the vestibule 76 may be moved horizontally so as to project various distances from a side 56 of the tunnel section 28. This vestibule 76 is of a generally box-like construction andcarries at an end 78 remote from the section 28 a conventional canopy 80 which is adapted to abut against an aircraft hull (not shown) around an aircraft door during the use of the bridge 10.

A side 82 of the vestibule 76 is preferably provided with lost motion type interengaging sliding wall panels 84 defining a central opening 86 leading into the frame 62 so that the interior of the vestibule 76 will always be open to the interior of this frame 62 in all positions of the vestibule 76. Those panels 84 which are capable of the greatest movement are located on the exterior of the side 82 and are preferably secured directly to the frame 62 so as to cause movement of the other of the panels 84 as the vestibule 76 is moved horizontally. This structure is also described in the aforenoted U.S. patent application Ser. No. 230,829.

It will be noted that the bottom 60 of the frame 62 carries a small floor section 88 which is approximately level with the interior of the bottom 74 of the vestibule 76. Preferably another conventional flexible walkway 90 is provided to connect this floor section 88 with the interior of the bottom 54 of the tunnel section 28 so as to avoid the possibility of someone tripping because of the space between the end 64 and the floor section 88. It will be noted that this floor section 88 is also spaced so as to permit some relative movement between the frame 62 and the end 64 as the second support 66 is operated. This relative movement corresponds to that permitted at the end 30 of the tunnel section 26 in the frame 18 adjacent to the terminal 14.

The bottom 54 of the tunnel section 28 carries adjacent to one of its sides 56 an I-beam 92 serving as a rail which extends along at least part of the section 28. The bottom 54 also includes a flat plate 94 located parallel to the beam 92 so as to serve essentially as a thrust rail. The beam 92 and the plate 94 are utilized in connection with a carriage 96 having several sets of support rollers 98 and at least one thrust roller 100. As shown in FIG. 4 of the drawings these support rollers 98 engage the interior of the beam 92 so as to movably support the carriage 96 on the tunnel section 28. The thrust rollers 100 engage the plate 94 so as to stablize the carriage 96 in such a manner that it may be only moved so as to be parallel to the bottom 54 of the tunnel section 28.

The carriage 96 serves to support a rectilinear box-like vestibule 102 in such a manner that this vestibule 102 may be moved a part of the way along the length of the tunnel section 28 in accordance with the movement of the carriage 96. The carriage 96 also includes a lower cross bar 104 extending generally parallel to the tunnel section 28 and two beams 106 serving as rails. This cross bar 104 carries support rollers 108 engaging the bottom of a frame 110, and this frame 110 in turn carries stablizing rollers 112 which engage the interiors of the beams 106. This frame 110 carries a canopy 114 adapted to abut up against an aircraft hull which completely surrounds the vestibule 102. With this construction the canopy 114 preferably fits closely around the vestibule 102 so as to be movable with respect to the vestibule 102 during the use of the bridge 10.

One of the sides 56 of the tunnel section 28 adjacent to the vestibule 102 is provided with two door openings 116 and 118. This same side 56 carries top and bottom door tracks 120 which are adapted to support three sliding doors 122, 124 and 126. Normally the door 122 will cover the opening 116 so as to close this opening 116. Normally the doors 124 and 126 together will cover the opening 118 so as to close this opening 118. With this construction the door 122 can be moved to expose the opening 116 and either of the doors 124 or 126 can be moved to open a part of the opening 118.

The bridge 10 also includes a conventional control means 128 mounted on the interior of a side 56 of the tunnel section 28 which may be utilized in order to operate the first and second supports 48 and 66 in order to raise and lower the frames 38 and 62 independently of one another through the use of conventional mechanical means appropriate to the construction of these supports (not shown). The control means 128 are also capable of being operated in order to shift the relatively horizontal positions of the vestibules 76 and 102 with respect to the tunnel section 28. In the case of the vestibule 102, this movement is accomplished by movement of the carriage 96. The control means 128 may also be utilized to cause relative movement of the canopy 114 with respect to the vestibule 102.

Any convenient conventional mechanical means 130 may be utilized in order to cause any of these movements as a result of actuation of the control means 128. Suitable mechanical means are motor and chain drives as are disclosed in the aforenoted co-pending U.S. patent application, Ser. No. 230,829. For convenience, such drive means 130 are shown schematically in the drawings.

The utilization of the bridge 10 is essentially comparatively simple. When the bridge 10 is not being used, the canopy 114 is pulled back upon the vestibule 102 so as to be as close to the tunnel section 28 as the structure permits. At this same time, the vestibule 76 is also moved with respect to the tunnel section 28 so as to extend from it as little as the structure of this vestibule permits. The supports 48 and 66 may be conveniently left in any position when the bridge 10 is not in use. Also, when the bridge 10 is not in use the doors 122, 124 and 126 are closed.

When the bridge 10 is to be utilized with an aircraft (not shown) having only a single loading door, such an aircraft is normally parked so that this door is opposite the vestibule 76. After such an aircraft is parked the control means 128 are operated so as to bring the tunnel sections 26 and 28 into any necessary position so that thereafter the vestibule 76 may be extended from a side 56 of the tunnel section 28 so that the canopy 80 is in communication with the access door to the aircraft.

A major advantage of this invention relates to its utilization with aircraft having two loading doors located along the length of the aircraft. When the bridge 10 is to be utilized with such aircraft the procedure indicated in the preceding is followed so that the vestibule 76 is positioned so as to service the second door of the aircraft at the same time that the control means 128 are manipulated so as to place the tunnel section 28 relative to the ground so that the other vestibule 120 may thereafter be positioned so as to service the forward door of the aircraft. During the positioning of the vestibule 102 it will be brought along the length of the tunnel section 28 so as to be opposite the door it is to service and then the canopy 114 will be extended so as to be positioned generally around this door.

With the embodiment of the bridge 10 shown the doors 122 and 124 and 126 are located in the areas where the vestibule 102 is to be located when the bridge 10 is to be utilized in servicing aircraft having several loading doors as indicated. Thus, these doors 122, 124 and 126 are shown in the bridge 10 in what may be regarded as "standard" positions dictated by aircraft configurations. When the bridge 10 is in use only the individual door corresponding to the position in which the vestibule is located is opened.

In order to avoid passenger hazard it is possible to incorporate within the bridge 10 a simple mechanical interlock only enabling the doors 122, 124 and 126 to be opened when the vestibule 102 is opposite them. It is also possible to utilize roll-up curtains or the like instead of these doors 122, 124 and 126. Similarly, a door can be located in any convenient location so as to close off the vestibule 76 when the bridge 10 is not in use.

No effort has been made in this specification to specifically indicate various essentially minor things of this type since they are considered to be within routine skill of the art to which this invention pertains. What is important about this invention is the concept of utilizing several vestibules or access passageways at least one of which is movable along the length of a bridge section so that the bridge will accommodate various different aircraft. Preferably the tunnel employed is a sectional tunnel as described to facilitate the use of the bridge 10 with different aircraft having access doors located at different heights.

I claim:

1. In an aircraft loading bridge for use in providing access between an aircraft terminal opening and an aircraft, said bridge having a tunnel extending from said terminal in communication with said opening and a terminal, first vestibule for gaining access to an aircraft loading door at the extremity of said tunnel remote from said opening, the improvement which comprises:

a movable second vestibule movably mounted on said tunnel so as to extend outwardly from one side of said tunnel and so as to be movable along said side of said tunnel, means for extending said second vestibule away from said side of said tunnel so as to position said second vestibule to gain access to an aircraft loading door, closure means for providing access between the interior of said tunnel and the interior of said movable vestibule in various positions of said movable vestibule at said side of said tunnel and for closing off said side of said tunnel except where said second vestibule is located.

2. An aircraft loading bridge as claimed in claim 1 wherein:

said tunnel includes first and second tunnel sections located in end to end relationship with one another, said tunnel sections being connected together so as to be capable of being located in different positions relative to one another and relative to the horizontal, support means for supporting said tunnel sections and for locating said tunnel sections in different positions relative to one another and relative to the norizontal, said movable vestibule being movably mounted on one of said tunnel sections.

3. An aircraft loading bridge for use in providing access between an aircraft terminal opening and an aircraft, said bridge having a tunnel extending from said terminal in communication with said opening, in which the improvement comprises:

said tunnel including first and second tunnel sections located in an end to end relationship with one another, said first tunnel section having an end in communication with said opening in said terminal, first and second tunnel supports, said first tunnel support being located adjacent to the adjacent ends of said tunnel sections, said second tunnel support being located adjacent to the end of said second tunnel section remote from said terminal, first mounting means for supporting the end of said first tunnel section adjacent to said terminal with respect to said terminal, intermediate mounting means supporting the adjacent ends of said tunnel sections upon said first terminal support, final mounting means supporting the end of said second tunnel section remote from said terminal upon said second tunnel support, all of said mounting means serving to support said tunnel sections upon said sections so that said tunnel sections may be located in different positions relative to one another, carriage means mounted on said second tunnel section so as to be movable along part of the length of said second tunnel section, a movable vestibule movably mounted on said carriage means so as to be capable of being moved with said carriage means and so as to be capable of being moved so as to extend outwardly from said second tunnel various distances, a terminal vestibule mounted on said second terminal support so as to be capable of being moved vertically with the end of said second tunnel remote from said terminal and so as to be capable of being moved so as to extend outwardly from said second tunnel means various distances, means connecting the interiors of said vestibules with the interior of said second tunnel means so that in all positions of said vestibules and said second tunnel both of said vestibules can be utilized for aircraft loading purposes.

4. An aircraft loading bridge as claimed in claim 2 wherein:

the adjacent ends of said tunnel sections are pivotally connected together and the extremities of said tunnel sections remote from said adjacent ends of said tunnel sections are pivotally connected to said terminal and to said terminal vestibule, respectively, said support means comprises a first support means for raising and lowering said adjacent ends of said tunnel sections and a second support means for raising and lowering said terminal vestibule and the end of the tunnel section pivotally connected to said terminal vestibule, said first and second support means being separate from one another and being capable of being independently operated.

5. An aircraft loading bridge as claimed in claim 1 wherein:

said closure means comprises sliding doors movably mounted on said side of said tunnel section.

6. An aircraft loading bridge as claimed in claim 1 wherein:

said tunnel includes first and second tunnel sections located in end to end relationship with one another, said tunnel sections being connected together so as to be capable of being located in different positions relative to one another and relative to the horizontal, support means for supporting said tunnel sections and for locating said tunnel sections in different positions relative to one another and relative to the horizontal, said movable vestibule being movably mounted on one of said tunnel sections, the adjacent ends of said tunnel sections are pivotally connected togehter and the extremities of said tunnel sections remote from said adjacent ends of said tunnel sections are pivotally connected to said terminal and to said terminal vestibule, respectively, said support means comprises a first support means for raising and lowering said adjacent ends of said tunnel sections and a second support means for raising and lowering said terminal vestibule and the end of the tunnel section pivotally connected to said terminal vestibule, said first and second support means being separate from one another and being capable of being independently operated, movable closure means extending along said side of said tunnel on the tunnel section on which said movable vestibule is mounted for maintaining said side of said tunnel section closed in all positions of said movable vestibule, and said movable closure means comprise sliding doors mounted on said side of said tunnel section, said terminal vestibule is capable of being extended from the same side of said tunnel as said movable vestibule.

7. An aircraft loadinb bridge as claimed in claim 1 including:

closure means located at said side of said tunnel on both sides of said movable vestibule, said closure means serving to close off the interior of said tunnel in all positions of said movable vestibule.

* * * * *